(No Model.)

W. H. ST. JOHN.
ANTI-FRICTION PULLEY.

No. 468,843. Patented Feb. 16, 1892.

Witnesses
W. H. Cortland
Frederick Whiteley

Inventor
William H. St John
by A. P. Smith
Atty.

THE NORRIS PETERS CO., PHOTO-LITHO., WASHINGTON, D. C.

United States Patent Office.

WILLIAM H. ST. JOHN, OF LONG ISLAND CITY, ASSIGNOR OF ONE-HALF TO E. W. MORROW, OF NEW YORK, N. Y.

ANTI-FRICTION PULLEY.

SPECIFICATION forming part of Letters Patent No. 468,843, dated February 16, 1892.

Application filed April 18, 1891. Serial No. 389,428. (No model.)

*To all whom it may concern:*

Be it known that I, WILLIAM H. ST. JOHN, a citizen of the United States, residing at Long Island City, in the county of Queens and State of New York, have invented certain new and useful Improvements in Anti-Friction Pulleys; and I do hereby declare the following to be a full, clear, and exact description of the invention, such as will enable others skilled in the art to which it appertains to make and use the same.

My invention relates to certain improvements in anti-friction pulleys to be employed in hoisting-gears and for similar purposes wherever power is to be applied or transmitted and losses by friction are to be avoided as far as possible.

Figure 1:
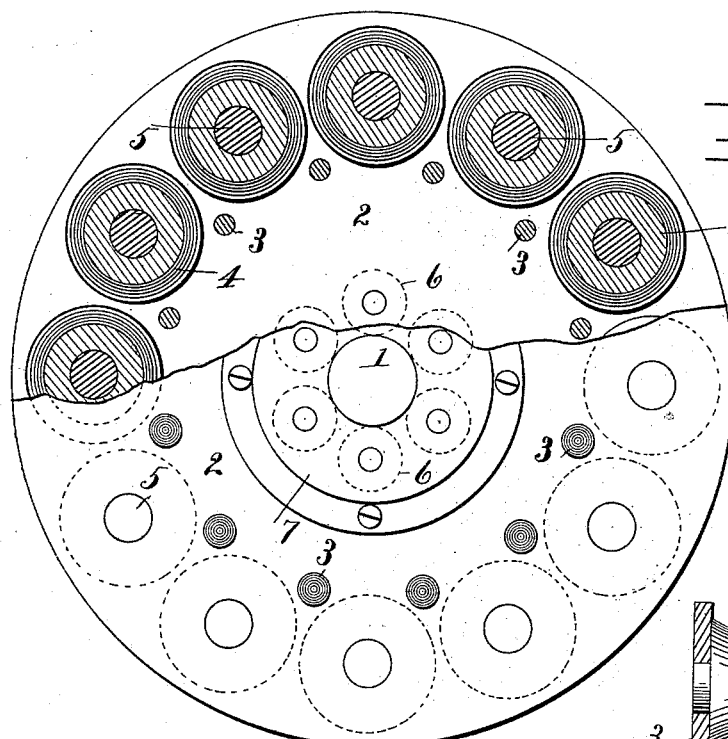
Figure 2:
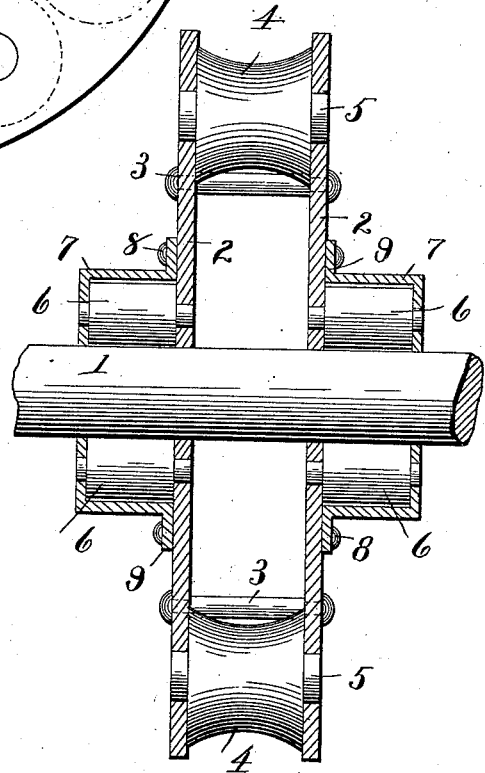

In the drawings, Figure 1 is a side view and partial section of my improved pulley. Fig. 2 is a cross-section formed by a plane passing through the axis of the pulley.

It is a recognized principle in mechanics that the losses due to friction can always be reduced by substituting rolling friction for sliding friction. I have applied this to the reduction of friction in pulleys used in the block-and-tackle, in the windlass-and-pulley, and in other hoisting-gears and similar forms of apparatus. It is also known that much of the loss of power in gearing of this kind is due to the stiffness of the rope or chain running over the pulleys, the stiffness preventing the ropes from readily adjusting themselves to the contour of the pulley and thereby lengthening the lever-arm of the weight and shortening the lever-arm of the power. To obviate these difficulties I have designed a pulley the face of which is composed of a number of grooved friction-rollers, which yield at every point to the rope or chain passing around the pulley.

Referring to the drawings, 1 is the shaft on which the pulley turns. 2 2 are the side plates, which are held together by the bolts or rivets 3 to form the pulley-frame. In this frame and near the circumference are mounted the grooved friction-rollers 4 on the axles 5. The axle 5 may be stationary and the roller 4 turn with it, or the axle may be rigid with the roller and turn in its bearings in the plates 2. Various other arrangements of the rollers could be made without interfering with their free revolution or departing from the point of my invention.

The pulley may of course revolve in ordinary plain bearings; but I prefer to use cylinder or ball bearings, so as to eliminate all friction. One such arrangement is illustrated, though the others might be substituted. The bearing-boxes 7 are mounted at the center of plates 2, being attached to the latter by screws or bolts 8 passing through the flanges 9. In these bearing-boxes are mounted the bearing-rollers 6, which run on the shaft.

The manner of operation of my invention is of course easily understood from the foregoing description. The advantage derived from its use is the more perfect elimination of friction. As the rope runs over the pulley and stretches or contracts under the varying strains, the grooved rollers turn easily and adjust themselves to the varying conditions without friction. Whatever the inequalities in the surface of the rope or chain, or its kinkiness, the yielding contact of these rolling surfaces enables it to readily adjust itself close to the face of the pulley, and the line of action of the weight and of the power is a tangent to the circumference of the pulley, or at least a more nearly perfect tangent than is usually the case, and the percentage of power transmitted is therefore greater and the loss less.

Having therefore described my invention, what I claim as new, and desire to protect by Letters Patent, is—

1. A pulley consisting of the revolving frame, the friction-rollers mounted in said frame near the circumference thereof, and the roller-bearings for said frame, substantially as described.

2. A pulley consisting of the side plates, the bolts by which said side plates are held together, the friction-rollers mounted between said plates near the circumference, the bearing-boxes at the center of said plates, and the friction-rollers mounted therein, substantially as described.

In testimony whereof I affix my signature in presence of two witnesses.

WILLIAM H. ST. JOHN.

Witnesses:
WARREN W. FOSTER,
A. P. SMITH.